United States Patent
Sadrizadeh et al.

(10) Patent No.: US 11,615,382 B2
(45) Date of Patent: Mar. 28, 2023

(54) DEVICES, SYSTEMS, AND METHODS FOR SECURING AND TRANSACTING CRYPTOCURRENCY ASSETS

(71) Applicant: Xeeda Inc., Irvine, CA (US)

(72) Inventors: Seyed Parham Sadrizadeh, Irvine, CA (US); Alireza Ghanavati, Irvine, CA (US); Amirhossein Mansourighasri, Los Angeles, CA (US)

(73) Assignee: Xeeda Inc., Irvine, CA (US)

( * ) Notice: Subject to any disclaimer, the term of this patent is extended or adjusted under 35 U.S.C. 154(b) by 1124 days.

(21) Appl. No.: 16/237,639

(22) Filed: Dec. 31, 2018

(65) Prior Publication Data

US 2019/0251524 A1    Aug. 15, 2019

Related U.S. Application Data

(60) Provisional application No. 62/618,305, filed on Jan. 17, 2018, provisional application No. 62/612,355, filed on Dec. 30, 2017.

(51) Int. Cl.
| | |
|---|---|
| *G06Q 20/06* | (2012.01) |
| *H04L 9/30* | (2006.01) |
| *G06Q 20/40* | (2012.01) |
| *G06Q 20/38* | (2012.01) |

(52) U.S. Cl.
CPC ......... *G06Q 20/065* (2013.01); *G06Q 20/389* (2013.01); *G06Q 20/3829* (2013.01); *G06Q 20/401* (2013.01); *H04L 9/30* (2013.01); *G06Q 2220/00* (2013.01); *H04L 2209/56* (2013.01)

(58) Field of Classification Search
CPC ............ G06Q 20/065; G06Q 20/3829; G06Q 20/389; G06Q 20/401; G06Q 2220/00
See application file for complete search history.

(56) References Cited

U.S. PATENT DOCUMENTS

| | | | |
|---|---|---|---|
| 10,354,325 B1* | 7/2019 | Skala | G06Q 20/065 |
| 2016/0261411 A1 | 9/2016 | Yau et al. | |
| 2017/0352012 A1* | 12/2017 | Hearn | G06Q 20/3829 |
| 2018/0004931 A1 | 1/2018 | Kounavis et al. | |
| 2018/0301925 A1 | 10/2018 | Wang et al. | |
| 2019/0012663 A1 | 1/2019 | Masters | |
| 2019/0121988 A1* | 4/2019 | van de Ruit | H04L 9/0825 |
| 2019/0197378 A1* | 6/2019 | Garner | G06K 19/06037 |
| 2019/0349201 A1* | 11/2019 | Fuerstner | H04L 9/14 |
| 2020/0065799 A1* | 2/2020 | Lu | G06Q 20/40145 |

* cited by examiner

*Primary Examiner* — Jay Huang
(74) *Attorney, Agent, or Firm* — UltimatEdge IP Law Group, P.C.; Dean G. Stathakis

(57) ABSTRACT

A system for secure transactions of cryptocurrencies is provided herein, where the system includes a computing device having a software application installed thereon and is configured to store a public cryptocurrency key. And further includes a hardware encryption device configured to store a private cryptocurrency encryption key, and is configured to selectively connect in data communication to the computing device for signing an cryptocurrency transaction. The computing device broadcasts a signed transaction received from the hardware encryption device for verification of the transaction.

12 Claims, 5 Drawing Sheets

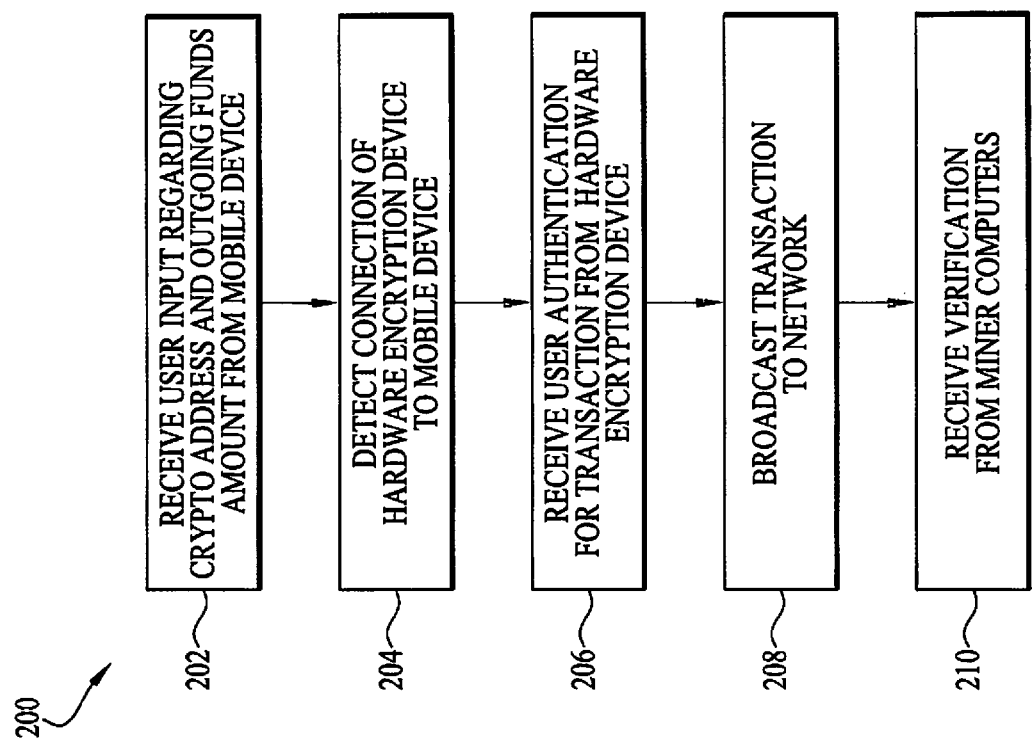
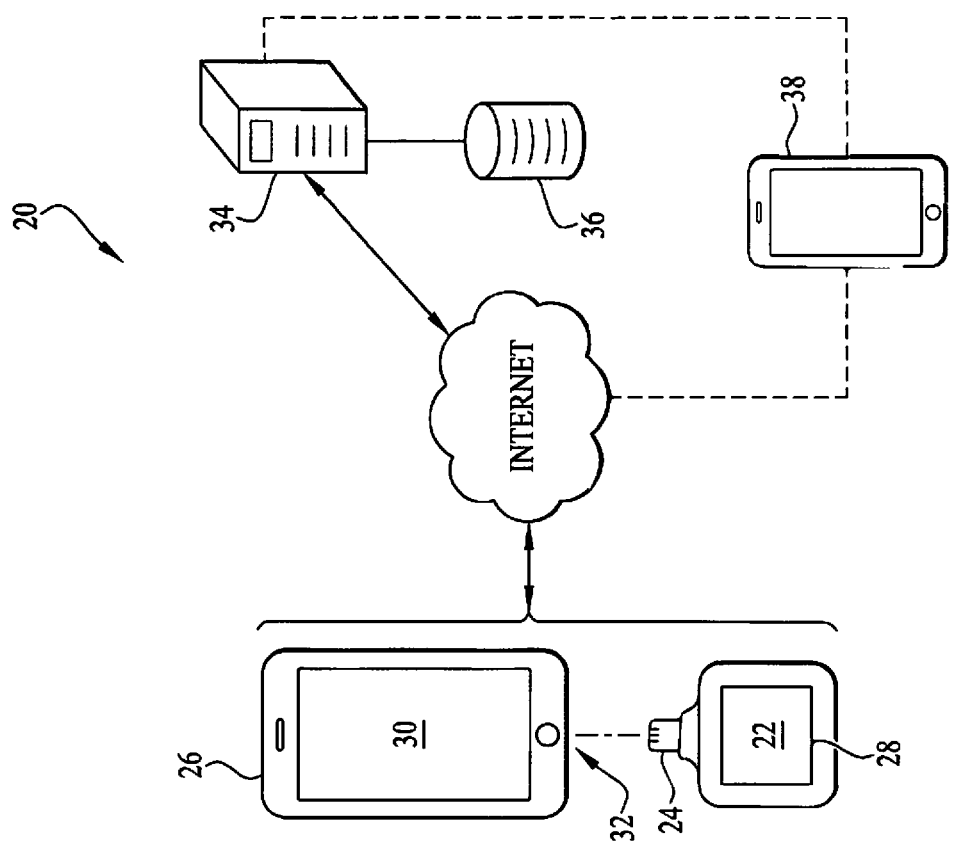

| FIG. 4A |
|---|
| FIG. 4B |
| FIG. 4C |

DEVICES, SYSTEMS, AND METHODS FOR SECURING AND TRANSACTING CRYPTOCURRENCY ASSETS

This application claims the benefit of priority and the filing date pursuant to 35 U.S.C. § 119(e) to U.S. Provisional Patent Application 62/618,305, filed Jan. 17, 2018, and U.S. Provisional Patent Application 62/612,355, filed Dec. 30, 2017, the content of each which is hereby incorporated by reference in its entirety.

BACKGROUND

The subject of this patent application relates generally to systems and methods for use in the storing and transacting cryptocurrency assets and tokens through use of one or both of a software and hardware.

By way of background, in any cryptocurrency transaction and storage (such as Bitcoin, or other non-Bitcoin currencies collectively known as Altcoins), a private key and public key is required to complete the transaction. The public key is similar to an account number which facilitates the transmission of funds thereto. The private key is kept confidential; and is used to sign outgoing payments (e.g., sending funds to other accounts).

Since the access and knowledge of the private key determines ownership of the cryptocurrency funds (stored in a "wallet"), keeping the private key secure and confidential has proven to be a great challenge. Further, the anonymous nature of cryptocurrencies and the lack of safeguards makes these currencies prime targets for phishing attacks, viruses, malware, etc. with the aim of stealing the funds.

Existing security solutions for cryptocurrencies have shortcomings are often difficult for the average user to adopt. Existing solutions include storing the assets on online exchanges and wallets, storing the assets on local computers (desktops, laptops, mobile devices, etc.). Online wallets have been targets of hacks or unscrupulous owners who abscond with the client funds. Non-air gapped local storage solutions, again, are vulnerable to various attacks, and rely on the user's personal knowledge of cyber security, which is usually lacking.

Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing a method and system for secure transactions of cryptocurrencies is provided herein, where the system includes a computing device having a software application installed thereon and is configured to store a public cryptocurrency key. And further includes a hardware encryption device configured to store a private cryptocurrency encryption key, and is configured to selectively connect in data communication to the computing device for signing an cryptocurrency transaction. The computing device broadcasts a signed transaction received from the hardware encryption device for verification of the transaction.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings:

FIG. 1 is a simplified schematic view of an exemplary system for facilitating the transaction of cryptocurrencies using one or more computing device and a hardware encryption device, in accordance with at least one embodiment;

FIG. 2 is a flow chart of the present computer implemented system and method, using the present hardware encryption device in accordance with at least one embodiment;

Figure 3:
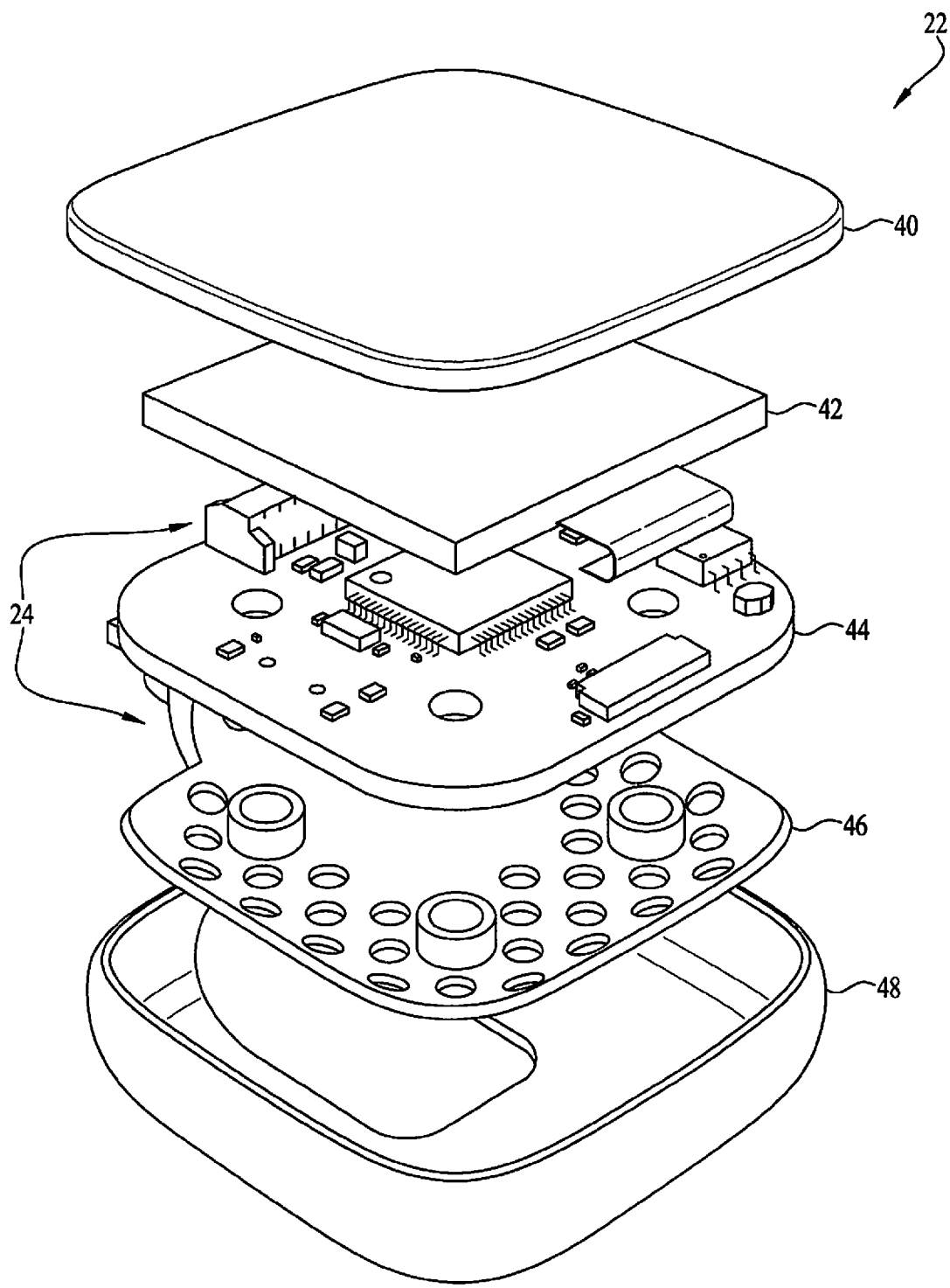
FIG. 3 is an exploded perspective view of the hardware encryption device.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments

DETAILED DESCRIPTION

The detailed descriptions set forth below in connection with the appended drawings are intended as a description of embodiments of the invention, and is not intended to represent the only forms in which the present invention may be constructed and/or utilized. The descriptions set forth the structure and the sequence of steps for constructing and operating the invention in connection with the illustrated embodiments. It is to be understood, however, that the same or equivalent structures and steps may be accomplished by different embodiments that are also intended to be encompassed within the spirit and scope of the invention.

The present system and method provides a software implemented method installed on one or, preferably both of a local computing device (e.g., a smartphone, a laptop, desktop, and the like) and a hardware encryption device. The present system and method facilitate the securing and transacting cryptocurrencies by storing the private key in a secure hardware encryption device (or hardware wallet), other than within smartphones or other local computing device accessible by the user). The present device stores the private key and selectively connects to the smartphone for signing the transactions. Multiple authentication processes are disclosed and used in conjunction with the presently technology.

Computer networks are well known in the art, often having one or more client computers and one or more servers, on which any of the methods and systems of various disclosed embodiments may be implemented. In particular the computer system, or server in this example, may represent any of the computer systems and physical components necessary to perform the computerized methods discussed in connection with the present figures and, in particular, may represent a server (cloud, array, etc.), client, or other computer system upon which e-commerce servers, websites, databases, web browsers and/or web analytic applications may be instantiated.

The exemplary system 20 illustrates an exemplary server 34 (acting as a miner computer) with associated database 36, an optional second computer device 38, and the local computing device 26 (a smartphone, in this example) are generally known to a person of ordinary skill in the art, and each may include a processor, a bus for communicating information, a main memory coupled to the bus for storing information and instructions to be executed by the processor and for storing temporary variables or other intermediate information during the execution of instructions by processor, a static storage device or other non-transitory computer readable medium for storing static information and instructions for the processor, and a storage device, such as a hard disk, may also be provided and coupled to the bus for storing information and instructions.

The miner computer 34 and other computing devices 26, 38 may optionally be coupled to a display for displaying information. However, in the case of server 34, such a display may not be present and all administration of the server may be via remote clients. Further, the server 34 and other computers 26, 38 may optionally include connection to an input device for communicating information and command selections to the processor, such as a keyboard, mouse, touchpad, microphone, and the like. Moreover, the computers and the hardware encryption device 22 may optionally include connection to an output device for communicating information. The present hardware encryption device 22 is connected to the smartphone 22, only when required for transactions requiring authorization using the private key, via a connector 24 (e.g., a LIGHTNING connector, a micro-USB connector, a USB-C connector, and the like). The hardware encryption device 22 can optionally include a touchscreen 28 or other screen for communicating information to the user, receiving password or biometric information (e.g., a fingerprint—although a separate biometric reader may be included), and for receiving other user input. As will be discussed further below, in one embodiment, the connector 24 is rigidly or flexibly mounted directly to the hardware encryption device 22, for example, being mounted to a board therein and extending directly from the housing 48. Connection to the smartphone 26 may be made using wireless connections (such as BLUETOOTH, or other standard or custom wireless protocols) or through an integral or separate cable (not shown).

At the outset, it should be noted that communication between each of the smartphone 26, the miner computer 34, and other computer 38 may be achieved using any wired- or wireless-based communication protocol (or combination of protocols) now known or later developed. As such, the present invention should not be read as being limited to any one particular type of communication protocol, even though certain exemplary protocols may be mentioned herein for illustrative purposes. It should also be noted that the various computers or computing devices described are intended to include any type of computing or electronic device now known or later developed, such as desktop computers, mobile phones, smartphones, laptop computers, tablet computers, virtual reality systems, personal data assistants, gaming devices, POS systems, vending machines, unattended terminals, access control devices, point of interaction ("POI") systems, etc.

The mining computer 34, smartphone, and the remote or other computer 38 may also include a communication interface coupled to the bus, for providing two-way, wired and/or wireless data communication to and from the server and/or client computers. For example, the communications interface may send and receive signals via a local area network, public network, intranet, private network (e.g., a VPN), or other network, including the Internet.

In the present illustrated example, the hard drive of the user smartphone 26 and the hardware encryption device 22 are encoded with executable instructions, that when executed by a processor (in each device) causes the processor to perform acts as described in the methods of figures. In an example embodiment, the user interacts with the smartphone 26 to access and interact with the graphical user interface through either a web application running on a mobile web browser or a mobile application (commonly called an "app") installed on the smartphone 26 and displayed on the screen 30. The application installed on the smartphone 26 communicates and sends/receives data to/from the hardware encryption device 22, when the device connector 24 is inserted into and in data communication with the smartphone 26, through the smartphone connector 32.

Referring now to FIG. 2, which broadly describes one example embodiment of the present method 200, the user decides to which address to send the funds, which can be entered into the user interface displayed on the smartphone 26 display 30, with or without the hardware encryption device 22 connected. The application installed on the smartphone 26 receives the user in destination cryptocurrency address and the amount of funds to be sent to that address, step 202. The hardware encryption device 22 stores the cryptocurrency private key or keys, and includes a stored amount of funds in token form (such as n number of Bitcoins). The application on the smartphone 26 and/or the application installed on the hardware encryption device 22 detects when the hardware encryption device 22 is in data communication with the smartphone 26, step 204. The application installed on the smartphone 26 receives an authorization to perform the transaction, as defined by the user, from the hardware encryption device 22, step 206, and the funds to be transferred are sent to the hardware wallet on the smartphone, while the remaining funds remain on the hardware encryption device 22. The transaction is confirmed by the user and signed by the private key on the hardware encryption device 22. The application installed on the smartphone, then broadcasts the signed transaction to the network, step 208, where the miner computer(s) verify the transaction. Thereafter, the verification for the transaction is received by the application installed on the smartphone 26, step 210. The hardware encryption device 22 may be in data communication with the smartphone 26 throughout the transaction, or may be optionally detached or disconnected from the smartphone 26 after it send the authorization to the smartphone.

The hardware encryption device 22 generates and stores the private key in a secure microcontroller (secure element). As illustrated in FIG. 3, the hardware encryption device 22 includes a touchscreen display 40 with a display beneath 42, an electronic board supporting the microcontroller and associated components, a connection port 24, a support frame 46, and a bottom housing 48. The connection port could be different based on the type of smartphone or mobile device that is being used in conjunction with the device. The type of connection is not limited to mobile connectors; and it could be any other related connection method such as USB connectors for desktops.

The present hardware encryption device 22 (hardware wallet) uses hierarchical deterministic key generation to derive a theoretically infinite number of cryptographic secrets from a single master seed. In this way, the cryptocurrency private keys, passwords, and other cryptographic secret data can all be determined and intrinsically stored in a single master seed. The hardware encryption device 22 can use the BIP39 industry standard for creating the master seed, and uses BIP32 industry standard for HD key generation and BIP44 for the handling of multiple coins, multiple accounts, external and internal chains per account and millions of addresses per chain, which allows the creation of an infinite number of wallets and private keys for cryptocurrency coins.

The hardware encryption device 22 includes two hardware chips. Chip one is a standard I/O microcontroller such as but not limited to a STM32 microcontroller. This part is in charge of input and output signals and does not store the private key, The other part of the PCB that stores the private key and interactions with the STM MCU through the 10 pins is called Secure Microcontroller Units (ST MCU). Secure MGU is a tamper resistant chip that is generally used for storing cryptographic information, The hardware encryption device 22 does not require any battery to operate. The hardware wallet uses the cellphone power to operate, and is dormant when disconnected. Alternatively, an onboard or external power source may be provided to the hardware encryption device 22.

In one or more embodiments, the hardware encryption device 22 does not have any port, and uses wireless data transfer protocols such as Bluetooth, NFC, WiFi, ZigBee or any other related protocols to sign the transactions. The smartphone 26 application automatically detects the surrounding for the hardware encryption device 22. If the hardware encryption device 22 (or hardware key) is found, it requests conformation for entering the next layer of authentication such as biometrics sensor or password. The hardware encryption device 22 does not trust any request made by the device it is plugged into. It requires the user to confirm any request made to it via a built in FP or biometric scanner. The hardware encryption device 22 contains the user's private keys stored in an EAL5+ secure element. The keys never leave that element.

In one or more embodiments, the hardware encryption device 22 is equipped with biometric sensors such fingerprint, or eye detection to authenticate and sign the transaction. The sensors are installed on the hardware encryption device 22. The device could be powered to use some pre-defined transactions. Such pre-defined transactions could be transferring some predefined amounts to the wallet on the smartphone 26 that does not require the hardware encryption device 22 to sign. This feature could be used if users need to hold large balances in the hardware encryption device 22 and smaller balances for everyday use in the mobile app wallet on the smartphone 26. The hardware encryption device 22 could have a single button to transfer the pre-defined amounts to the smartphone 26 wallet that doesn't require hardware wallet.

In one or more embodiments, the hardware encryption device 22 can independently make a transaction. The hardware encryption device 22 has all the required wireless communication protocols (such as but not limited to, NFC, Bluetooth, and Wi-Fi) to make payments directly. For example, the hardware encryption device 22 can be configured to communicate directly (peer-to-peer) with merchant point of sale (POS) devices or other computing device. The users use the biometric authentication methods or passcodes to authenticate and send transaction for everyday use.

In order to make it easier for the end user to perform daily trading while securing their assets, the present system uses a hot wallet and cold wallet. Wallets or private keys can be generated and stored in the application on the smartphone 26 or in the hardware encryption device 22. The user can transfer the cryptocurrency assets between the hot wallet (with the private key stored in the application) and cold wallet (with the private key stored in the hardware encryption device 22). In this way, the user can have a small amount of cryptocurrency in the hot wallet for quick transactions, and, yet, transmit the funds to the hardware encryption device 22 (hardware wallet) for higher level security.

The present hardware encryption device 22 best performs in conjunction with mobile app that provides an integrated ecosystem for the end user. The application is the main gateway for interacting with the cryptocurrencies networks. The present application is used as multi-token cryptocurrency wallet, and is used to send and receive coins. In general, receiving cryptocurrency does not require the hardware encryption device 22 to be connected. Sending any funds out requires the presence of the hardware encryption device 22. When the recipients address and the amount to be sent is defined, the application looks for the related private key on the hardware encryption device 22 to sign the transaction. Existing smartphone authentication is used to unlock the hardware encryption device 22, and authorizes the owner of the device. A personal identification (PIN) code can be entered on the device as a backup authentication method.

In one or more embodiments, the present method can include methods of currency conversion with the application, to convert from one form of cryptocurrency to another and/or to convert a cryptocurrency to a fiat currency (such as the US dollar, the Euro, etc.) or vice versa. Further, the present application can download current cryptocurrency market prices from one or more exchanges, so that the current value of the user's assets in each wallet in a fiat currency can be displayed within the user interface, in real-time and showing historical prices in the form of charts or numerical data. Further, market changes can be displayed within the user interface, including alerts for price changes of user-defined or predefined magnitudes. Moreover, in one or more embodiments, the user can send and receive cryptocurrencies directly from the application installed on the smartphone and/or the hardware encryption device 22. In one or more embodiments, the present application can connect to on-line exchanges to replenish the user's cryptocurrency wallet; where thereafter, the funds can be transmitted to the hardware encryption device 22.

In yet another embodiment of the present system and method, the user is rewarded when a transaction is made by the generation of proof of transaction tokens. For example, when the user completes a transaction with a merchant and/or a non-merchant (such as a another user), at least part of a token is created for the user's wallet.

The quantity of proof of transaction tokens generated is determined by a mathematical algorithm, which includes the weighing of each type of transaction to determine the number of proof of transaction tokens generated. In one example algorithm, the amount of proof of transaction tokens generated is calculated by: # of tokens=$(K_1) \times (K_2) \times (K_3) \times \ldots (K_n)$, where each "K" represents a factor. For example, $K_1$ can represent the weight given to the age of the account, $K_2$ can represent the weight given to the frequencies of each payment within a predetermined time period, $K_3$ can represent the weight given to the increase or decrease of the currency amount of the current transaction compared to one or more prior transactions, $K_1$ can represent the weight given to customers who return to the same merchant and/or who are new customers to the merchant or to the system, and so on. Multiple other factors may be used to determine the number of tokens generated in each transaction. Further, a dividend (in the form of more tokens, cash, or other reward) can be provided to users who hold the proof of transaction tokens for a predetermined period of time, the amount being determined, for example, by the time the tokens are held and/or the number of tokens being held. The proof of transaction tokens may be I the form of an existing crypto-currency, a custom cryptocurrency, a points system being exchangeable for goods and/or services or discounts thereto. The proof of transaction tokens are stored with the user's wallet, either on the smartphone 26 or the hardware encryption device 22.

Figures 4, 4A:
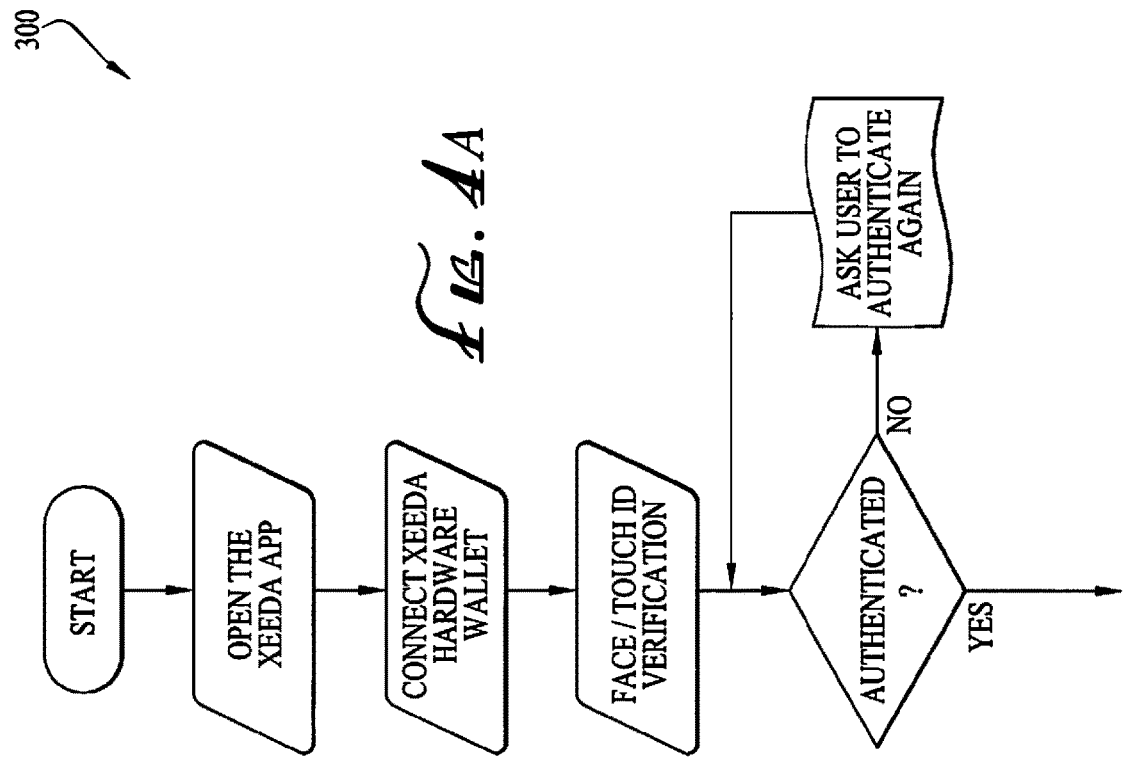
FIGS. 4A-C is a flow chart of the system and method of FIG. 2, showing greater detail.
Figure 4B:
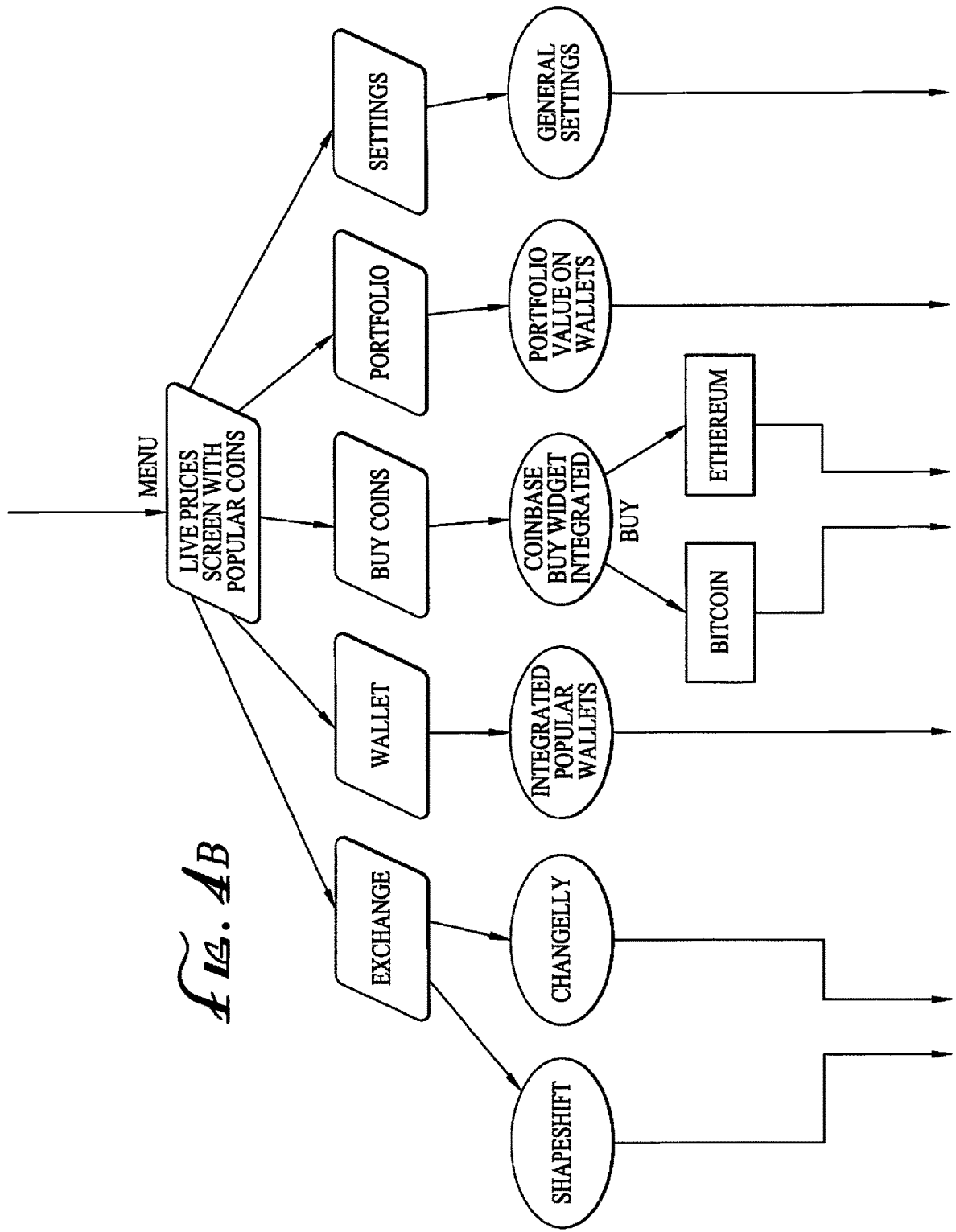
Figure 4C:
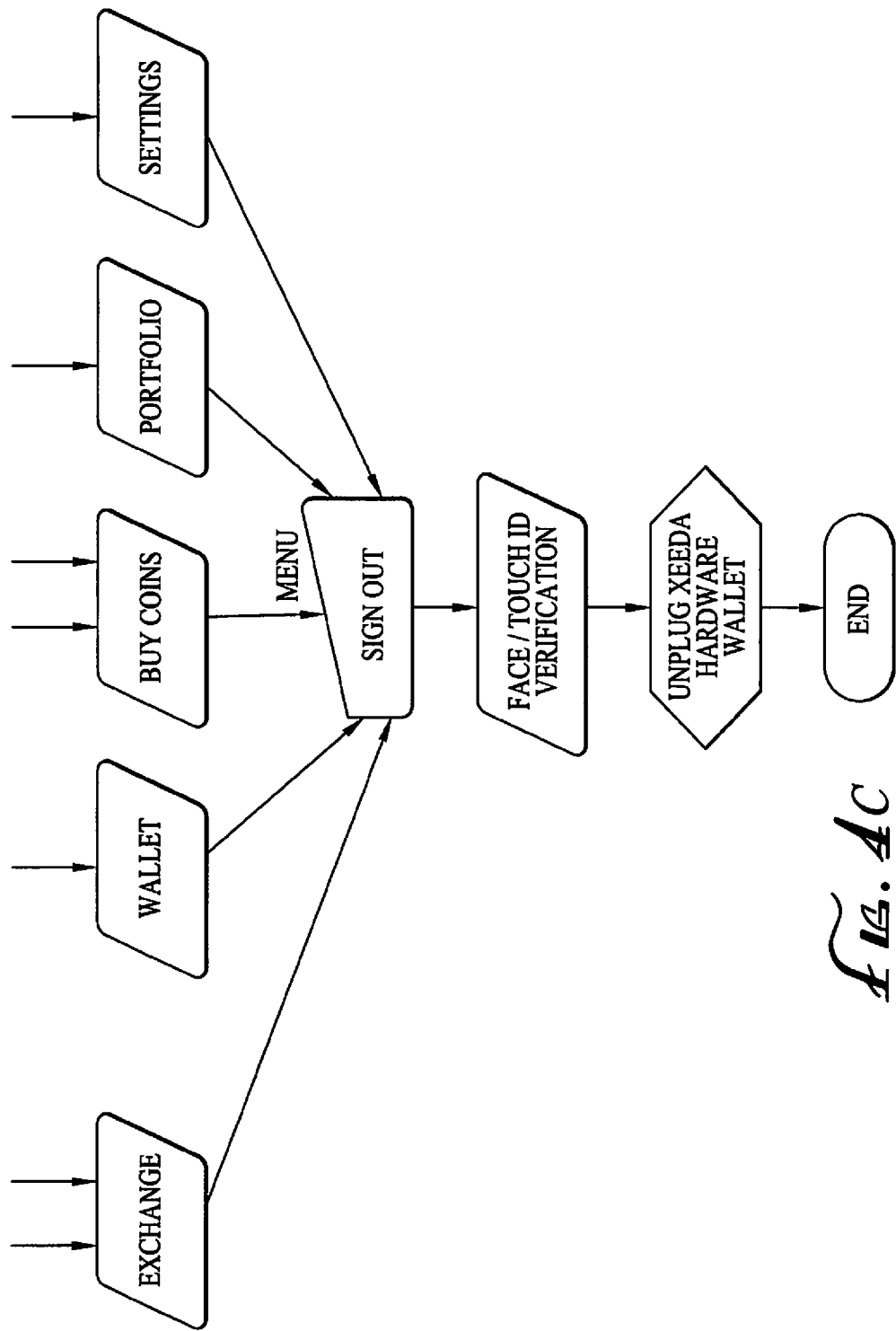

FIGS. 4A-C illustrate the method of FIG. 2 in greater detail, showing a flow chard of the present method 300.

All transactions are signed by the hardware encryption device 22 via an API in which the application sends the requested transaction to be signed to the hardware encryption device 22. A display on the hardware encryption device 22 displays all the parameters of the requested transaction and requests user confirmation via a finger print scanner internal to the hardware encryption device 22. The user confirms the transaction by a successful finger print match at which point the hardware encryption device 22 signs the transaction with the users embedded private key and returns the signed transaction to the application for sending to the blockchain.

There are numerous layers of protection within the hardware encryption device 22 to prevent hacking of the device. All firmware in the hardware encryption device 22 is signed with a code signing private key. The processing elements within the hardware encryption device 22 are preprogrammed with the code signing public key which is used to verify the downloaded firmware is a compatible and permitted product before that firmware is executed.

The hardware encryption device 22 contains a processing element that has numerous layers of physical tamper protection. For example, a Maxim Deep Cover ARM processor or the like. This processor controls the display and performs the biometric (fingerprint, facial recognition, etc.) match. The biometric scanner in the hardware encryption device 22 communicates with the processor over a TLS secured SPI bus. This makes the biometric matching immune to replay attacks.

The Secure Element used in the hardware encryption device 22 is also talking on a TLS secured SPI bus only to the ARM processor. This thwarts any replay attacks. During the initial hardware encryption device 22 initialization process in manufacturing, the ARM processor generates a unique random key which is then sent to the Secure Element. The Secure Element stores this key and from that point on will require all messages over the SPI bus to be signed by that unique immutable key. This protects from an attack where the Secure Element is removed from the original hardware encryption device 22 and is then placed in another hardware key in an attempt to bypass the biometric authentication.

The process of entering a BIP39 seed phrase is done entirely on the hardware encryption device 22 using its internal display and biometric scanner so that the seed phrase is never entered in the host smartphone 26 or other computing device. In addition, the hardware encryption device 22 supports a two factor seed phrase and password. Again, all are entered directly on the hardware encryption device 22, never on the host device (e.g., the smartphone 26), thus never leaving the hardware encryption device 22 and is immune to snooping attacks.

In one or more example embodiments, a true random number generator in the ARM processor can be used to generate a unique salt for each hardware encryption device 22 that is used in the BIP39 initialization. This would produce a mnemonic phrase that's unique to this hardware encryption device 22. The system 20 (or company or organization that controls or manages the system) knows the mapping between each hardware encryption device 22 and that unique salt. Should a user lose their hardware encryption device 22, they must prove to the system manager that they are the owner of a particular hardware encryption device 22, in order for the production of a replacement hardware encryption device 22 with the same salt as the original hardware encryption device 22. They can then enter their mnemonic phrase into the new hardware encryption device 22 to regenerate their private keys. Without having the same salt in the hardware encryption device 22, the mnemonic phrase would be useless in regenerating their private keys. This adds yet another level of authentication required for using the mnemonic phrase to generate keys.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular compound, composition, article, apparatus, methodology, protocol, and/or reagent, etc., described herein, unless expressly stated as such. In addition, those of ordinary skill in the art will recognize that certain changes, modifications, permutations, alterations, additions, subtractions and sub-combinations thereof can be made in accordance with the teachings herein without departing from the spirit of the present specification. It is therefore intended that the following appended claims and claims hereafter introduced are interpreted to include all such changes, modifications, permutations, alterations, additions, subtractions and sub-combinations as are within their true spirit and scope.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc. —for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as "comprise" and "comprises", and equivalent open-ended transitional phrases thereof like "including," "containing" and "having", encompasses all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such embodiments described herein or so claimed with the phrase "comprising" are expressly or inherently unambiguously described, enabled and supported herein for the phrases "consisting essentially of" and "consisting of."

All patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents is based on the information available to the applicant and does not constitute any admission as to the correctness of the dates or contents of these documents.

Lastly, the terminology used herein is for the purpose of describing particular embodiments only, and is not intended to limit the scope of the present invention, which is defined solely by the claims. Accordingly, the present invention is not limited to that precisely as shown and described.

The invention claimed is:

1. A system for secure transactions of cryptocurrencies, the system comprising:
  a computing device having a software application installed thereon, the computing device configured to store a public cryptocurrency key; and
  a hardware encryption device configured to store a private cryptocurrency encryption key, the hardware encryption device configured to selectively connect in data communication to the computing device for signing a cryptocurrency transaction, the hardware encryption device including one or more biometric readers configured to capture a user's biometric credentials for authenticating the private cryptocurrency encryption key upon request for biometric verification from the hardware encryption device by the software application, when the software application detects that the hardware encryption device has been associated with the computing device, and when a user wants to sign the cryptocurrency transaction in conjunction with the software application;
  wherein the computing device broadcasts a signed transaction received from the hardware encryption device for verification of the cryptocurrency transaction and wherein the one or more biometric readers are not activated to sign the cryptocurrency transaction when the user wants to transfer an amount of cryptocurrency from the hardware encryption device to the software application that is below a predefined amount.

2. The system of claim 1, wherein the one or more biometric readers include a fingerprint reader or an eye scanner, and wherein the one or more biometric readers also include a display component configured to enable the user to enter the biometric credentials.

3. The system of claim 1, wherein the computing device is a local computing device that includes a mobile telephone, a laptop computer, or a desktop computer.

4. The system of claim 1, wherein the computing device is a point-of-sale computing device for processing payment transactions using a peer-to-peer communication with the hardware encryption device.

5. The system of claim 1, wherein the hardware encryption device is configured to store one or more applications that enable cryptocurrency transactions using specific cryptocurrencies.

6. The system of claim 1, wherein the cryptocurrency transaction is written to a blockchain after verification of the biometric credentials.

7. A method, comprising:
  detecting a cold wallet coupled to a mobile computing device, the mobile computing device storing a public cryptocurrency key and the cold wallet storing a private cryptocurrency key, the public cryptocurrency key and the private cryptocurrency key required to sign a cryptocurrency transaction involving the cold wallet;
  requesting authentication of the cold wallet using one or more biometric readers when the cold wallet is coupled to the mobile computing device; and
  requesting authentication to sign the cryptocurrency transaction using the one or more biometric readers,
  wherein the mobile computing device broadcasts a signed transaction received from the cold wallet for verification of the cryptocurrency transaction and wherein the one or more biometric readers are not activated to sign the cryptocurrency transaction when the user wants to transfer an amount of cryptocurrency from the cold wallet to a hot wallet associated with the mobile computing device that is below a predefined amount.

8. The method of claim 7, wherein the hot wallet at least includes a software application resident on the mobile computing device or accessible from the mobile computing device.

9. The method of claim 7, wherein the cold wallet at least includes a hardware encryption device that includes the one or more biometric readers.

10. The method of claim 7, wherein the one or more biometric readers include a fingerprint reader or an eye scanner, and wherein the one or more biometric readers also include a display component configured to enable the user to enter biometric credentials.

11. The method of claim 7, wherein the cold wallet is configured to store one or more applications that enable cryptocurrency transactions using specific cryptocurrencies.

12. The method of claim 7, wherein the cryptocurrency transaction is written to a blockchain after verification of the user's biometric credentials.

* * * * *